May 7, 1968  H. E. ROWEN  3,381,949
FLOATING SEAL FOR A TRAVELLING GRATE MACHINE
Filed Nov. 26, 1965  2 Sheets-Sheet 1
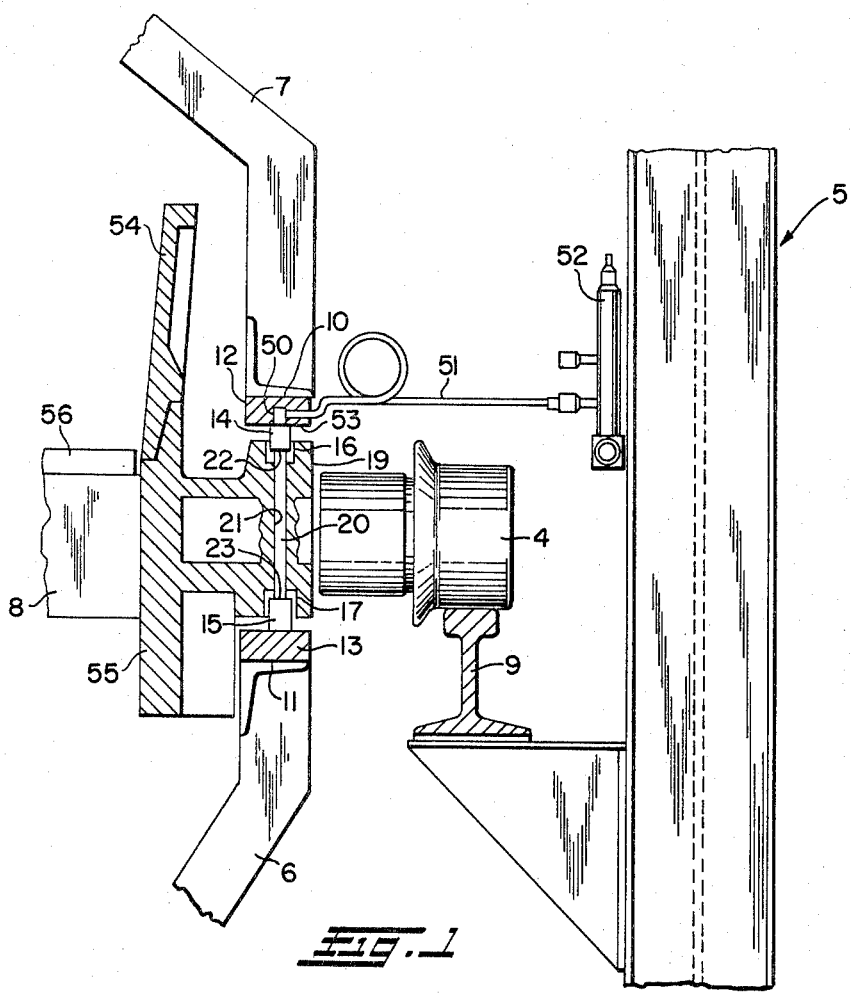
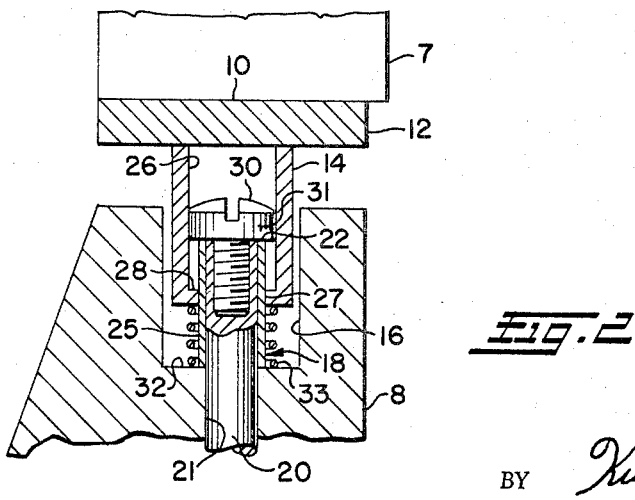
INVENTOR
HAROLD E. ROWEN
BY *Kramer & Sturger*
ATTORNEYS May 7, 1968 H. E. ROWEN 3,381,949
FLOATING SEAL FOR A TRAVELLING GRATE MACHINE
Filed Nov. 26, 1965 2 Sheets-Sheet 2

INVENTOR
HAROLD E. ROWEN
BY *Kramer & Sturges*
ATTORNEYS

United States Patent Office 3,381,949
Patented May 7, 1968

3,381,949
FLOATING SEAL FOR A TRAVELLING GRATE MACHINE
Harold E. Rowen, Lakewood, Ohio, assignor to McDowell-Wellman Engineering Company, a corporation of Ohio
Filed Nov. 26, 1965, Ser. No. 509,971
6 Claims. (Cl. 266—21)

ABSTRACT OF THE DISCLOSURE

There is provided sealing means between a windbox and a hood and pallets moving between the hood and windbox, as in a traveling grate machine.

---

This invention relates to seals, and more particularly to a seal for closing the air space between a windbox, hood, and pallets moving therebetween.

The invention is described in relation to its use in a sintering machine of either the straight line or circular type, as it is particularly well suited for use in such machines.

The sintering machine with which this invention is concerned, employs a hood in surmounted and spaced relation from a windbox. The windbox and hood form an envelope in which a plurality of pallets move. Portions of the pallets, however, protrude from, and are movable between the windbox and hood, thereby breaking the seal of the envelope. For example, the pallets carry wheels which are supported, and movable along a trackway disposed adjacent and outside the windbox and hood. The envelope formed by the windbox and hood, is exposed to the ambient atmosphere unless a suitable seal is provided between the windbox, moving pallets and hood. Such a seal is desirable, as this type sintering machine is utilized in carrying out many processes which necessitate sealing the process from the ambient atmosphere, e.g. a process carried on under pressure, or the gases formed during the process are at high temperatures, or disagreeable, or toxic in nature.

Providing such a seal is a problem, which can be more fully appreciated by realizing that oftentimes older, worn pallets are used in conjunction with newer pallets. This creates a problem as one pallet may be misaligned or tilted in relation to adjacent pallets. Misalignment of the pallets is also caused by pieces of the burden on the rails of the trackway, which forces the pallets out of line. Further misalignment of the pallets is caused by wear on the pallet wheels or rails of the trackway. Also, in cases where the straight-line type sintering machine is employed, the pallets as they move into position for receiving a charge, or burden, are occasionally tilted, i.e., the front pallet wheels are riding above the trackway. Such a problem is difficult to correct as the same pallet on its next time around may be aligned and operate smoothly. Contact between many of the sealing bars or members presently employed, is broken because of these discrepancies between the pallets. Thus, the seal becomes ineffective. This invention is directed to providing an improved seal between the windbox, moving pallets and hood.

Briefly stated, this invention is in a seal for sealing the spaces between a hood mounted in spaced relation from a windbox, the hood and windbox having at least one pair of opposed and fixedly spaced marginal edges. Further, at least one pallet is movable between the windbox and hood. In accordance herewith, there is provided a sealing member on each of the marginal edges of the hood and windbox. A pair of spaced sealing members are carried by the pallet for engaging corresponding opposed sealing members of the windbox and hood, and sealing the space between the marginal edges and the moving pallet. Also provided are means coacting with the pallet sealing members for biasing them against the hood and windbox sealing members, said means allowing the pallet to float or oscillate freely between, and relative to the pallet sealing members.

The following description of the invention will be better understood by having reference to the annexed drawing, wherein:

FIG. 1 is an enlarged, fragmentary, sectional view of a conventionally designed sintering machine showing the hood, pallets and windbox, and an embodiment of the seal of this invention;

FIG. 2 is an enlarged, fragmentary, sectional view of the embodiment of the seal of FIG. 1;

Figure 3:
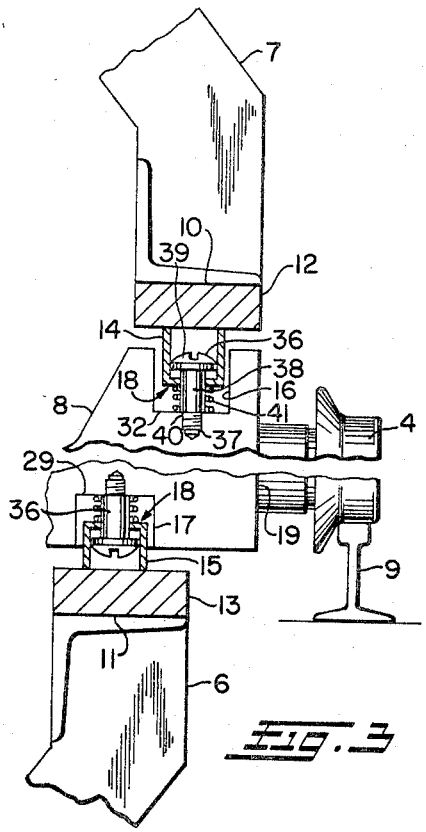
FIG. 3 is an enlarged, fragmentary, sectional view of a conventionally designed sintering machine showing the hood, pallets and windbox, and another embodiment of the seal of this invention.
Figure 5:
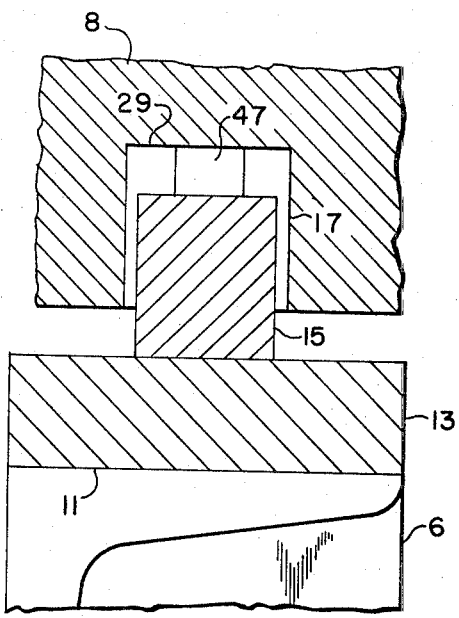
FIG. 5 is a fragmentary, sectional view of the embodiment of FIG. 4, the section being taken in the plane indicated by the line 5—5 of FIG. 4.

Referring generally to FIGS. 1–5 and more particularly to FIGS. 1 and 2 of the annexed drawing, there is shown a sintering machine, either of the straight line or circular type, generally indicated at 5. The sintering machine 5 comprises a windbox 6, a hood 7 in surmounted and fixed, spaced relation from the windbox 6, and a plurality of pallets, e.g. pallet 8, movable between the windbox 6 and hood 7. The pallets have wheels, e.g. wheel 4 of pallet 8, which are supported on, and movable along a trackway whose rails are adjacent and outside the windbox 6 and hood 7, e.g. rail 9.

The windbox 6 and hood 7, normally, have two pairs of fixedly spaced and oppositely disposed marginal edges. For convenience, the description of the invention is related to one of these pairs, e.g. hood marginal edge 10, and windbox marginal edge 11, in relation to pallet 8.

A sealing member 12 is mounted on hood marginal edge 10. A sealing member 13 is mounted on windbox marginal edge 11.

The pallet 8 carries a pair of spaced sealing members or bars 14 and 15, respectively, which are biased against the oppositely and adjacently disposed hood sealing member 12 and windbox sealing member 13.

A pair of oppositely disposed recesses 16 and 17 are formed in the pallet 8 adjacent its marginal edge 19. The pallet recesses 16 and 17, respectively, are in aligned relation to hood sealing member 12 and windbox sealing member 13. The pallet sealing bars 14 and 15 are partially disposed in, and extend from their respective pallet recesses 16 and 17 for biased sealing engagement with the hood sealing member 12, and the windbox sealing member 13.

The pallet sealing bars 14 and 15 are mounted to reciprocate, oscillate freely within limits in the recesses 16 and 17, relative to the pallet 8. Any suitable mounting means, generally indicated at 18, may be provided for accomplishing this.

As previously indicated, the hood 7 and windbox 6 are fixedly mounted relative to each other. Therefore, their marginal edges and sealing members secured thereon, are in fixed, parallel relation, this being a matter of simple construction. Thus, as the pallet 8 moves along the pallet trackway, there will be relatively no displacement of the pallet sealing bars 14 and 15 relative to each other, and the hood and windbox sealing members 12 and 13, respectively. The means 18 for mounting the pallet sealing bars within their respective recesses, however, permits the pallet 8 to float or oscillate freely between the pallet sealing bars 14 and 15. This is the basic concept of the invention, to bias the pallet sealing bars against the windbox and hood sealing members, thereby keeping the pallet sealing bars moving in relatively fixed planes while allowing the pallets to fluctuate or oscillate freely between the planes in which the pallet sealing bars move. Utilizing this concept, it has been found that a highly improved seal between the hood, windbox and moving pallets is maintained. The pallet sealing bars can move transversely across the windbox and hood sealing members without breaking the seal therebetween. Thus, the pallets can be tilted, or misaligned while still maintaining a satisfactory seal between the sealing bars of the pallets and the sealing members of the windbox and hood.

An embodiment of the means 18 for mounting the pallet sealing bars 14 and 15 within their respective recesses, is shown in greater detail in FIG. 2, and takes into account that the pallet recesses 16 and 17 are aligned. This particular embodiment includes a shaft or rod 20 common to both pallet sealing bars. The shaft 20 extends through an opening or passageway 21 in the pallet 8. Passageway 21 extends between, and is in aligned relation to the pallet recesses 16 and 17. Thus, the pallet 8 is movable relative to the shaft 20. One, or a plurality of such shafts 20 may be carried by each pallet depending on the size of the pallet.

The pallet sealing bars 14 and 15 are mounted on the shaft ends 22 and 23, respectively, for movement relative to the shaft 20. For convenience, the following description relates only to sealing bar 14 on shaft end 22, it being understood that sealing bar 15 is similarly affixed to shaft end 23.

A collar 25 of predetermined length is mounted on, and surrounds the shaft end 22. The collar 25 and shaft end 22 extend through a restricted opening or passageway 27 into an enlarged passageway or bore 26 in the pallet sealing bar 14. The restricted pallet bar opening 27 is formed by a collar or flange 28 extending into the enlarged passageway or bore 26.

A machine screw 30 is threadably engaged on the shaft end 22. The machine screw 30 has an enlarged head 31, which has a diameter greater than the restricted pallet bar opening 27, but less than the pallet bar bore 26. The machine screw head 31 abuts the shaft end 22 and collar 25, and acts as a stop or abutment in spaced relation from the bottom 32 of the recess 16. The movement of the pallet sealing bar 14 is limited by the restricted-movement of the sealing bar flange 28 between the recess bottom 32 and the machine screw head 31.

A biasing member in the form of a coil spring 33 surrounds the collar 25. The coil 33 is compressed between the recess bottom 32 and the sealing bar 14 as the sealing bar 14 rides along the hood sealing member 10. The spring 33 is provided to bias the pallet sealing bar 14 against the hood sealing member 12. The sealing bar mounting mechanism 18 permits the pallet sealing bar 14 to move relative to the windbox sealing member 12 and the pallet 8. The machine screw head 31, as previously indicated, acts as a stop, and keeps the pallet sealing bar 14 from being biased out of the pallet recess 16.

In cases where the pallet sealing bars are axially aligned, the single shaft 20 can be satisfactorily replaced by a pair of hollow shafts (not shown), one shaft being slidable within the other and forming a split shaft. The pallet sealing bars 14 and 15 would then be secured to the split shaft ends and a coil spring placed within the hollow shafts for biasing the pallet sealing bars 14 and 15 against the hood and windbox sealing members 12 and 13, respectively. Any suitable mechanism could be provided to keep the pallet sealing bars 14 and 15 from being biased out of their respective recesses.

Referring more particularly to FIG. 3, there is shown another embodiment of the means 18 for mounting the pallet sealing bars within their respective recesses. This particular embodiment can be used in cases where the pallet recesses are axially aligned, or in offset relation. This embodiment utilizes a screw or bolt 36 for holding the pallet sealing bars within their respective recesses while allowing them to oscillate or reciprocate freely within predetermined limits.

The screws 36 are centrally disposed within the pallet recesses 16 and 17. One, or a plurality of screws 36 may be provided in each pallet and spaced along the pallet sealing bars depending on the size of the pallets. Each screw 36 has a threaded end 37 which is engaged in the bottom of the recesses, e.g. bottom 32 of recess 16. Each screw 36 has an enlarged shank portion 38, which acts in a manner similar to the collar 25, that is, it acts as a spacer for holding an enlarged screw head 39 in spaced relation from the bottom of the recess.

An abutment 40 is formed between the threaded screw end 37 and its enlarged shank portion 38. The threaded screw end 37 is turned into, for example, the recess 16 until the screw abutment 40 abuts the recess bottom 32. The pallet sealing bars are similarly mounted on the screws 36 for limited reciprocating movement along the screw shank 38. A coil spring 41 similarly surrounds the screw shank 38 for biasing the pallet sealing bars against their corresponding sealing members on the hood and windbox.

Figure 4:
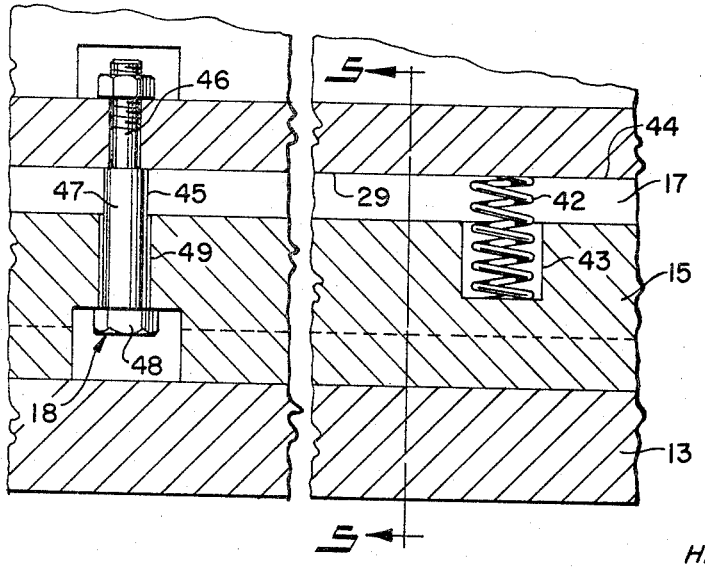
FIG. 4 is an enlarged, fragmentary, sectional view of still another embodiment of this invention.

The embodiment of the means 18 for mounting the pallet sealing bars illustrated in FIG. 4, alternately uses a spring 42 and bolt 45 for mounting the pallet sealing bars within their respective recesses, e.g. mounting pallet sealing bar 15 for limited movement and biased sealing engagement with the windbox sealing member 13. The spring 42 is in the form of a coil spring disposed in a pallet sealing bar recess 43. The coil spring 42 extends from the bar recess 43 for biased engagement against the bottom of the recess, e.g. bottom 44 of recess 17. The coil spring 42 coacts with the pallet sealing bar to bias it against the corresponding sealing member of the hood or windbox.

The bolt 45 has a threaded end 46, an enlarged shank 47, and an enlarged head 48, similar to the bolt or screw 36 used in the embodiment illustrated in FIG. 3. The bolt 45 is threadably secured within the pallet recess similar to the screw 36, that is, the bolt head 48 is fixedly secured in spaced relation from the bottom of the pallet recess, e.g. bottom 44 of pallet recess 17. The bolt shank 47 extends through an opening 49 in the pallet sealing bar, e.g. bar 15. The pallet bar opening 49 is slightly larger than the bolt shank 47, but smaller than the bolt head 48, to allow the pallet sealing bar to move or reciprocate freely between fixed limits governed by the distance between the bolt head 48 and the recess bottom 29. The bolt head 48 also keeps the pallet sealing bar from being biased out of its respective recess.

In some cases it may be desirable to provide a lubricant between the pallet sealing bars and their corresponding hood and windbox sealing members. One method of accomplishing this is illustrated in FIG. 1, and relates to lubricating pallet sealing bar 14, such method being also suitable for lubricating pallet sealing bar 15. A plurality of holes or passageways, e.g. passageway 50, are disposed in the hood sealing member 12. A tube 51 communicates with, and extends from this passageway 50. The free end of the tube 51 is secured to, and communicates with a source of lubricant supply 52 mounted on the sintering machine 5. Lubricant is pumped from the source of supply 52, through the tube 51, and into the passageway 50. The lubricant lubricates the hood sealing member's surface 53 which is in contact with the pallet sealing bar 14. In this manner, the sealing bars and members are lubricated.

The pallet 8 is, preferably, provided with depending flanges 54 and 55 interposed between the pallet grates 56 and the pallet sealing bars 14 and 15, for protecting the pallet, hood and windbox sealing bars against intense heat from, for example, the process gases that are given off.

Thus, there has been provided a new and novel seal for sealing the spaces between the windbox, moving pallets and hood. Such sealing means permits the pallets to float or oscillate freely between a pair of spaced pallet sealing bars carried by the pallets for engaging corresponding sealing members mounted on the windbox and hood, to seal the spaces therebetween.

Other modes of applying the principle of this invention may be employed instead of those specifically set forth above, changes being made as regards the details herein disclosed, provided the elements set forth in any of the following claims, or the equivalent of such, be employed.

It is, therefore, particularly pointed out and distinctly claimed as the invention:

1. In an apparatus having a hood and a windbox with at least one pair of opposed, fixedly spaced marginal edges, and at least one pallet movable between the windbox and hood, the improvement which comprises: means for sealing the spaces between the marginal edges and the moving pallet, including:
  (a) a sealing member mounted on each of the opposed marginal edges of the windbox and hood;
  (b) a pair of spaced sealing bars carried by the pallet for engaging the windbox and hood sealing members respectively, and disposed in corresponding recesses in the pallet, the recesses being opposed and in aligned relation to the hood and windbox sealing members; and
  (c) means coacting with the pallet sealing bars for biasing them against corresponding opposed windbox and hood sealing members, said means allowing the pallet to float freely between and relative to the pallet sealing bars and said means being structurally similar for each of said spaced pallet sealing bars.

2. The apparatus of claim 1, wherein the means for biasing each pallet sealing bar, includes:
  (1) means coacting with each sealing bar for keeping it from being biased out of its recess, said means allowing the sealing bar to float within fixed limits relative to the pallet; and
  (2) a coil spring coacting with each sealing bar for biasing it in a direction towards the corresponding opposed sealing members on the windbox and hood.

3. In an apparatus having a hood and a windbox with at least one pair of opposed, fixedly spaced marginal edges, and at least one pallet movable between the windbox and hood, the improvement which comprises: means for sealing the spaces between the marginal edges and the moving pallet, including:
  (a) a sealing member mounted on each of the opposed marginal edges of the windbox and hood;
  (b) a pair of oppositely disposed recesses in the pallet, the recesses being aligned with the corresponding opposed sealing members on the windbox and hood;
  (c) a sealing bar partially disposed in each of the pallet recesses, and carried by the pallet for engaging the windbox and hood seals, the pallet sealing bars mounted for floating movement relative to the pallet, and for biased engagement against the windbox and hood sealing members;
  (d) means coacting with the sealing bars for mounting them in the pallet recesses including means coacting with each sealing bar for keeping it from being biased out of the pallet recesses, said means allowing the sealing bars to float within fixed limits relative to the pallet;
  (e) means coacting with the sealing bars for biasing them against the windbox and hood sealing members respectively, and including a coil spring coacting with each sealing bar for biasing it in a direction towards the corresponding opposed sealing members on the windbox and hood; and
  (f) at least one mounting member carried by the pallet and extending between the opposed windbox and hood sealing members for mounting the pallet sealing bars in the recesses and supporting the means for biasing said pallet sealing bars against the corresponding opposed windbox and hood sealing members.

4. The apparatus of claim 3, which includes flanges depending from the pallet adjacent the pallet recesses for protecting the sealing members and bars from intense heat given off by processes carried on within the apparatus.

5. A seal for sealing the space between at least one pair of fixedly spaced marginal edges of a hood and windbox, and a pallet moving therebetween, comprising:
  (a) a sealing member on the marginal edges of the hood and windbox;
  (b) a pair of spaced sealing bars carried by the pallet for biased engagement against the sealing members, to seal the space between the hood, pallet and windbox; and
  (c) means coacting with the sealing bars for biasing them against the sealing members of the hood and windbox, said means allowing the pallet to float between the pallet sealing bars, as the sealing bars move along and against the sealing members said biasing means being similar for each pallet sealing bar.

6. The seal of claim 5, wherein the biasing means, includes:
  (d) at least one spring coacting between the pallet and each pallet sealing bar; and
  (e) means coacting between the pallet and each sealing bar for limiting the movement of the bars relative to the pallet.

References Cited

UNITED STATES PATENTS

| | | | |
|---|---|---|---|
| 2,563,135 | 8/1951 | Rowen | 266—21 |
| 2,789,809 | 4/1957 | Grabau et al. | 266—21 |
| 2,825,550 | 3/1958 | Rowen | 266—21 |
| 2,853,289 | 9/1958 | Schofield | 266—21 |
| 3,059,912 | 10/1962 | Cotton | 266—21 |
| 3,172,936 | 3/1965 | Koontz | 266—21 |
| 3,302,936 | 2/1967 | Ban | 266—21 XR |

FOREIGN PATENTS

| | | |
|---|---|---|
| 224,901 | 10/1959 | Australia. |
| 1,232,332 | 4/1960 | France. |

J. SPENCER OVERHOLSER, *Primary Examiner.*

WILLIAM J. STEPHENSON, *Examiner.*

R. S. ANNEAR, *Assistant Examiner.*